(12) United States Patent
Kopecek

(10) Patent No.: US 10,247,138 B2
(45) Date of Patent: *Apr. 2, 2019

(54) ELECTRIC TRACK LOCK

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/617,227

(22) Filed: Jun. 8, 2017

(65) Prior Publication Data
US 2017/0268460 A1    Sep. 21, 2017

Related U.S. Application Data

(63) Continuation of application No. 14/735,865, filed on Jun. 10, 2015, now Pat. No. 9,689,345.

(51) Int. Cl.
*G05G 5/06* (2006.01)
*F02K 1/76* (2006.01)
(Continued)

(52) U.S. Cl.
CPC ............ *F02K 1/766* (2013.01); *B64D 29/06* (2013.01); *G05G 5/08* (2013.01); *G05G 5/18* (2013.01);
(Continued)

(58) Field of Classification Search
CPC ............ F02K 1/72; F02K 1/763; F02K 1/766; G05G 5/08; G05G 5/18; G05G 5/24;
(Continued)

(56) References Cited

U.S. PATENT DOCUMENTS 2,805,584 A    9/1957  Hinsey
3,040,524 A    6/1962  Kurti
(Continued)

FOREIGN PATENT DOCUMENTS

EP    1286037 A1    2/2003
FR    2970521        7/2012
(Continued)

OTHER PUBLICATIONS

PCT International Search Report and Written Opinion of the International Searching Authority issued in International Application No. PCT/US2016/036381 dated Aug. 26, 2016; 16 pages.

*Primary Examiner* — Adam D Rogers
(74) *Attorney, Agent, or Firm* — Fish & Richardson P.C.

(57) ABSTRACT

The subject matter of this specification can be embodied in, among other things, a track lock assembly that includes a pawl assembly comprising a pawl arm extending from a pawl axis and configured to engage a slot in a slider assembly, a cam arm extending from the pawl axis and having a pawl cam, and a compliant member, and a position lock assembly comprising a first lock arm extending from a lock axis and an actuator configured to urge rotation of the first lock arm between a lock locked position and a lock unlocked position, the first lock arm configured to engage and retain the cam arm in a pawl locked position when the first lock arm is in the lock locked position and disengage the cam arm in the lock unlocked position such that the compliant member is able to urge the pawl assembly to a pawl unlocked position.

15 Claims, 6 Drawing Sheets

(51) Int. Cl.
  *B64D 29/06* (2006.01)
  *G05G 5/18* (2006.01)
  *G05G 5/08* (2006.01)
  *F02K 1/72* (2006.01)

(52) U.S. Cl.
  CPC ............... *F02K 1/72* (2013.01); *F02K 1/763* (2013.01); *F05D 2260/56* (2013.01); *Y02T 50/671* (2013.01)

(58) Field of Classification Search
  CPC ......... F16H 25/04; F16H 25/06; B64D 29/06; F05D 2260/56; Y02T 50/671
  See application file for complete search history.

(56) References Cited

U.S. PATENT DOCUMENTS

| | | |
|---|---|---|
| 3,344,604 A | 10/1967 | Mattia et al. |
| 3,500,645 A | 3/1970 | Horn |
| 3,511,055 A | 5/1970 | Timms |
| 4,391,409 A | 7/1983 | Scholz |
| 4,922,713 A | 5/1990 | Barbarin et al. |
| 5,257,840 A | 11/1993 | Rouzaud |
| 5,642,636 A | 7/1997 | Mitsui |
| 6,021,636 A | 2/2000 | Johnson et al. |
| 6,089,626 A | 7/2000 | Shoemaker |
| 6,517,041 B2 | 2/2003 | Raum |
| 6,584,763 B2 | 7/2003 | Lymons et al. |
| 7,409,820 B2 | 8/2008 | Ahrendt |
| 8,713,911 B2 | 5/2014 | Kopecek et al. |
| 8,919,668 B2 | 12/2014 | Vauchel |
| 9,109,536 B2 | 8/2015 | Willett |
| 9,249,756 B2 | 2/2016 | Caruel |
| 9,587,516 B2 * | 3/2017 | Fabre ...................... E05B 41/00 |
| 10,054,079 B2 * | 8/2018 | Kopecek ................ F02K 1/763 |
| 2008/0073172 A1 | 3/2008 | Ho |
| 2013/0292489 A1 | 11/2013 | Vauchel et al. |
| 2014/0270935 A1 | 9/2014 | Willett |
| 2015/0267639 A1 | 9/2015 | Gormley |
| 2018/0066607 A1 * | 3/2018 | Sawyers-Abbott ..... F01D 25/24 |
| 2018/0202390 A1 * | 7/2018 | Kopecek ................ F02K 1/766 |

FOREIGN PATENT DOCUMENTS

| | | |
|---|---|---|
| GB | 404618 A | 1/1934 |
| WO | WO 2005/040589 A2 | 5/2005 |

* cited by examiner

1

ELECTRIC TRACK LOCK

CROSS-REFERENCE TO RELATED APPLICATIONS

This application is a continuation application of and claims the benefit of priority to U.S. application Ser. No. 14/735,865, filed on Jun. 10, 2015, the contents of which hereby incorporated by reference.

TECHNICAL FIELD

This instant specification relates to locking mechanisms.

BACKGROUND

Contemporary aircraft engines may include a thrust reverse actuation system to assist in reducing aircraft speed during landing. Typical thrust reversers include a movable element that when in the active position reverses at least a portion of the air flow passing through the engine. During maintenance of such areas of the engine the movement of the movable part is inhibited for safety; currently, this is done manually by a user near the equipment that controls the hydraulic flow to the movable element.

SUMMARY

In general, this document describes locking mechanisms.

In a first aspect, a track lock assembly includes a pawl assembly comprising a pawl arm extending from a pawl axis and configured to engage a slot in a slider assembly, a cam arm extending from the pawl axis substantially opposite the pawl arm and having a pawl cam, and a compliant member configured to urge rotation of the pawl about the pawl axis from a pawl locked position, such that the pawl arm is engaged in the slot and the pawl cam is disengaged from a slider cam extending from the slider assembly, to a pawl unlocked position such that the pawl arm is biased away from the slot and the pawl cam is biased toward contact with the slider cam extending from the slider assembly, and a position lock assembly comprising a first lock arm extending from a lock axis and an actuator configured to urge rotation of the first lock arm between a lock locked position and a lock unlocked position, the first lock arm configured to engage and retain the cam arm in the pawl locked position when the first lock arm is in the lock locked position and disengage the cam arm in the lock unlocked position such that the compliant member is able to urge the pawl assembly to the pawl unlocked position.

Various embodiments can include some, all, or none of the following features. The slider assembly can be configured to slide the slider cam and the slot substantially perpendicular to the pawl axis such that movement of the slider assembly urges contact between the slider cam and the lock cam and rotation of the pawl assembly into the pawl locked position. The track lock assembly can include a sensor configured to provide a first indication when the lock assembly is in the lock locked position and provide a second indication when the position lock assembly is in the lock unlocked position. The track lock assembly can include a manual lock assembly having a first configuration which does not affect movement of the position lock assembly, and a second configuration in which the position lock assembly is urged into the lock unlocked position.

In a second aspect, a method of locking a track includes providing a track lock assembly proximal a slider assembly, the track lock assembly having a pawl assembly having a pawl cam and a pawl arm configured to pivot together about a pawl axis between a pawl locked position and a pawl unlocked position, and a position lock assembly configured to selectably permit or prevent movement of the pawl assembly between the pawl locked position and the pawl unlocked position. The method also includes sliding the slider assembly in a first direction perpendicular to the pawl axis. contacting a slider cam to the pawl cam in the pawl unlocked position, urging, by contact between the slider cam and the pawl cam, rotational movement of a distal end of the pawl arm into the slot, and contacting a slot end with the distal end as to interfere with sliding of the slider in the first direction.

Various implementations can include some, all, or none of the following features. The method can also include locking, by the position lock assembly, the pawl assembly in the pawl locked position such that the distal end of the pawl arm is within the slot. The method can also include unlocking, by the position lock assembly, the pawl assembly, rotating the pawl assembly to the pawl unlocked position such that the distal end of the pawl arm is removed from the slot, and sliding the slider assembly in a second direction opposite the first direction perpendicular to the pawl axis. The pawl assembly can include a compliant member configured to urge the pawl assembly into the pawl unlocked position, and urging, by contact between the slider cam and the pawl cam, rotational movement of a distal end of the pawl arm into the slot can also include biasing the compliant member, and rotating the pawl assembly to the pawl unlocked position such that the distal end of the pawl arm is removed from the slot can include urging, by the compliant member, rotation of the pawl assembly to the pawl unlocked position such that the distal end of the pawl arm is removed from the slot. The method can also include providing a manual lock assembly having a first configuration which does not affect movement of the position lock assembly, and a second configuration in which the position lock assembly is urged into the lock unlocked position, and configuring the manual lock assembly into the second configuration to urge the position lock assembly into the lock unlocked position. The method can also include providing a sensor configured to identify the lock locked position and the lock unlocked position, providing, by the sensor, a first indication when the lock assembly is in the lock locked position, and providing, by the sensor, a second indication when the lock assembly is in the lock unlocked position. The method can also include unlocking, by the position lock assembly, the pawl assembly, wherein the pawl arm includes an angular pawl face at a distal end opposite the pawl axis, sliding the slider assembly in a second direction opposite the first direction perpendicular to the pawl axis, wherein the slot includes a slot end having an angular end face that is complimentary to the angular pawl face, and contacting the angular end face with the angular pawl face as to urge rotation of the pawl assembly to the pawl unlocked position such that the distal end of the pawl arm is removed from the slot.

In a third aspect, a track lock assembly includes a pawl assembly having a pawl arm extending from a pawl axis and configured to engage a slot in a slider assembly, a cam arm extending from the pawl axis substantially opposite the pawl arm and having a pawl cam, and a compliant member configured to urge rotation of the pawl about the pawl axis from a pawl locked position such that the pawl arm is engaged in the slot and the pawl cam is disengaged from a slider cam extending from the slider assembly to a pawl unlocked position such that the pawl arm is biased away from the slot and the pawl cam biased toward contact with the slider cam extending from the slider assembly, and a position lock assembly comprising an actuator configured to selectably engage the pawl assembly to retain the pawl assembly in the pawl locked position and disengage the pawl assembly which does not affect movement of the pawl assembly between the pawl locked position and the pawl unlocked position.

Various embodiments can include some, all, or none of the following features. The slider assembly can be configured to slide the slider cam and the slot substantially perpendicular to the pawl axis such that movement of the slider assembly urges contact between the slider cam and the lock cam and urges rotation of the pawl assembly into the pawl locked position. The track lock assembly can include a sensor configured to provide a first indication when the lock assembly is engaged with the pawl assembly and provide a second indication when the position lock assembly is disengaged from the pawl assembly. The track lock assembly can include a manual lock assembly having a first configuration which does not affect engagement of the position lock assembly with the pawl assembly, and a second configuration in which the position lock assembly is urged into engagement with the pawl assembly. The pawl arm can include an angular pawl face at a distal end opposite the pawl axis, and the slot can include a slot end having an angular end face that is complimentary to the angular pawl face.

The systems and techniques described herein may provide one or more of the following advantages. First, a system can provide a light weight tertiary mechanism to prevent inadvertent in-flight deployment of a transcowl assembly. Second, the system can reduce the bulk, weight, and/or complexity associated with the large solenoids and/or reduction gearboxes generally used in direct-drive type tertiary locks for transcowl assemblies. Third, the system can use motion of a transcowl assembly to actuate the tertiary lock, rather than use electrical power to actuate a direct action solenoid or motor as with direct-drive type tertiary locks. Fourth, the system can reduce actuator stroke and/or power consumption by powering an actuator to baulk a locking element instead of actuating it.

The details of one or more implementations are set forth in the accompanying drawings and the description below. Other features and advantages will be apparent from the description and drawings, and from the claims.

DETAILED DESCRIPTION

This document describes locking mechanisms. More specifically, this document describes electric baulking type track lock tertiary lock mechanisms, for example, for use in thrust reverser actuation systems for cascade type turbofan and turbojet thrust reversers, and for variable fan nozzle (VAFN) actuation systems. In general, the locking mechanisms described in this document can directly lock the slider of a cascade type thrust reverser. The track lock tertiary locks described herein are generally lighter and more compact when compared to pin type locks.

Figure 1:
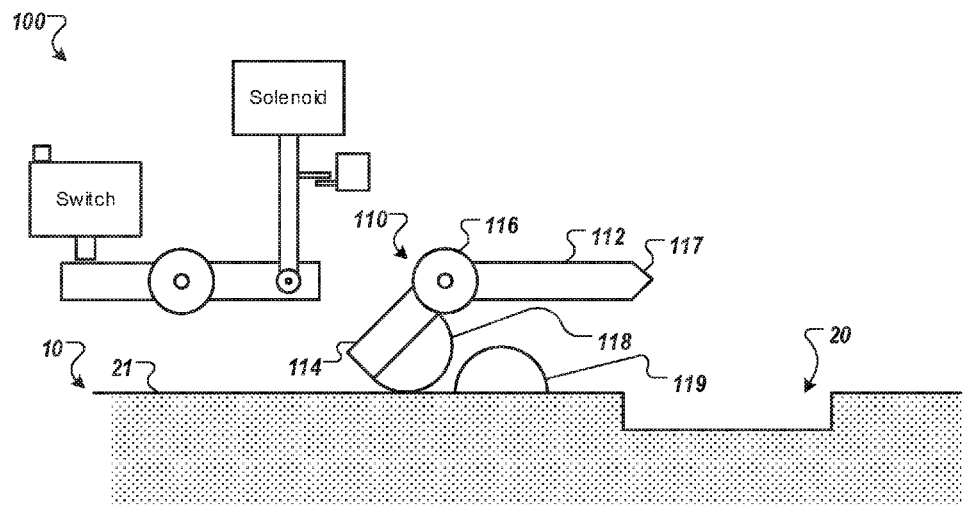
FIG. 1 is a block diagram that shows an example of a track lock system in an unlocked configuration.

FIG. 1 is a block diagram that shows an example of a track lock system 100 in an unlocked configuration. The track lock system 100 is located proximal to a slider assembly 10 that includes a slot 20 formed in a surface 21 of the slider assembly 10. The slider assembly 10 is configured to move linearly.

The track lock system 100 includes a pawl assembly 110. In the present example, the pawl assembly 110 of the track lock system 100 is shown in an unlocked configuration. The pawl assembly 110 includes a pawl arm 112 extending from a pawl axis 116, and a cam arm 114 extending from the pawl axis 116 substantially radially opposite the pawl axis 116 (e.g., about 90 degrees to about 180 degrees apart). The pawl assembly 110 is configured to pivot at least partly about the pawl axis 116. The track lock system 100 is arranged relative to the slider assembly 10 such that movement of the slider assembly 10 is substantially perpendicular to the rotation of the pawl axis 116.

The pawl arm 112 includes a distal end 117 that can be pivoted about the pawl axis 116 into contact with the surface 21 and the slot 20, as will be discussed further in the description of FIG. 2. The cam arm 114 includes a cam 118 extending substantially perpendicular to the cam arm 114 toward the slider assembly 10. The cam 118 is configured to contact a cam 119 as the slider assembly 10 is moved.

Figure 2:
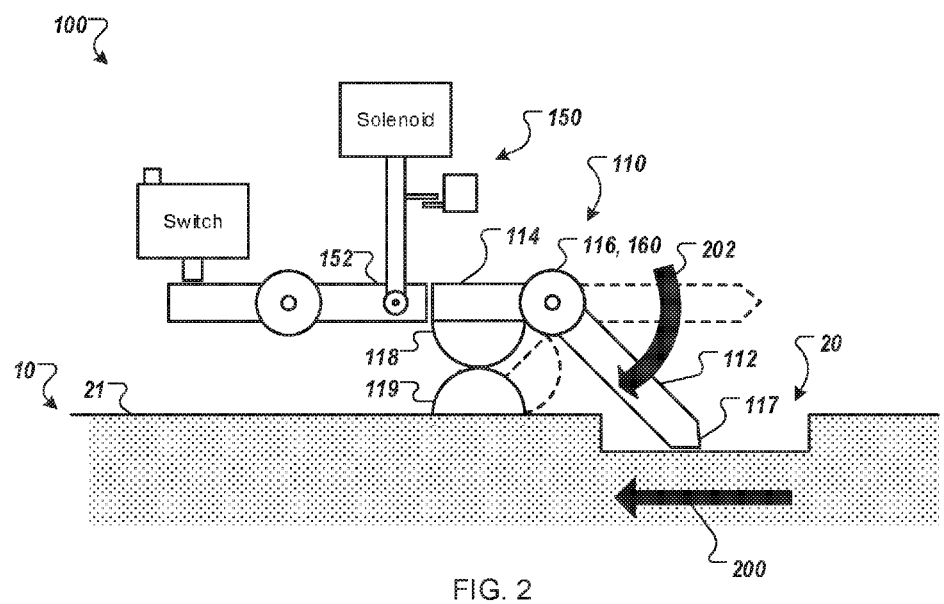
FIG. 2 is a block diagram that shows an example of a track lock system in a locked configuration.

FIG. 2 is a block diagram that shows an example of the track lock system 100 in a locked configuration. In the illustrated example, the slider assembly 10 has been moved, as indicated by arrow 200, relative to the track lock assembly 100 and relative to the position of the slider assembly 10 illustrated in FIG. 1.

Movement of the slider assembly 10 is urged by movement of external fixtures or equipment to which the slider assembly 10 is connected. For example, the slider assembly 10 may be affixed to, or part of, a transcowl assembly. As the transcowl assembly is urged to move by hydraulic, electric, pneumatic, or other force, the slider assembly 10 is urged to move as well.

Movement of the slider assembly 10 brings the cam 119 into contact with the cam 118. Contact between the cam 119 and the cam 118 causes the pawl assembly 110 to pivot about the pawl axis 116, as indicated by the arrow 202. Rotation of the pawl axis 116 causes the pawl arm 112 to extend into the slot 20 and bring the distal end 117 into contact or near-contact with the slot 20, transitioning from a pawl unlocked configuration to a pawl locked configuration.

Rotation of the pawl assembly 110 also brings the cam arm 114 into interfering contact with a lock arm 152 of a position lock assembly 150 in a lock locked configuration. As will be discussed in more detail in the descriptions of FIGS. 4-8, the position lock assembly 150 can be actuated between the lock locked configuration that can hold the pawl assembly 110 in the pawl locked configuration, and a lock unlocked configuration that does not interfere with movement of the pawl assembly 110 between the pawl unlocked configuration and the pawl locked configuration.

The pawl axis 116 includes a compliant member 160, such as a spring, that provides a torque that urges the pawl assembly 110 toward the pawl unlocked configuration. Contact between the cam 119 and the cam 118 also causes rotation of the pawl assembly 110 against the bias of the compliant member 160 (e.g., partly winds the spring). With the position lock assembly 150 in the lock locked configuration, the position lock assembly 150 resists the torque of the compliant member 160 and keeps the pawl assembly 110 in the pawl locked configuration as will be discussed in the description of FIGS. 3 and 7. With the position lock assembly 150 in the lock unlocked configuration, the compliant member 160 is able to torque the pawl assembly 110 into the pawl unlocked configuration (e.g., partly unwind the spring 160) as will be discussed in the description of FIGS. 4-5.

Figure 7:
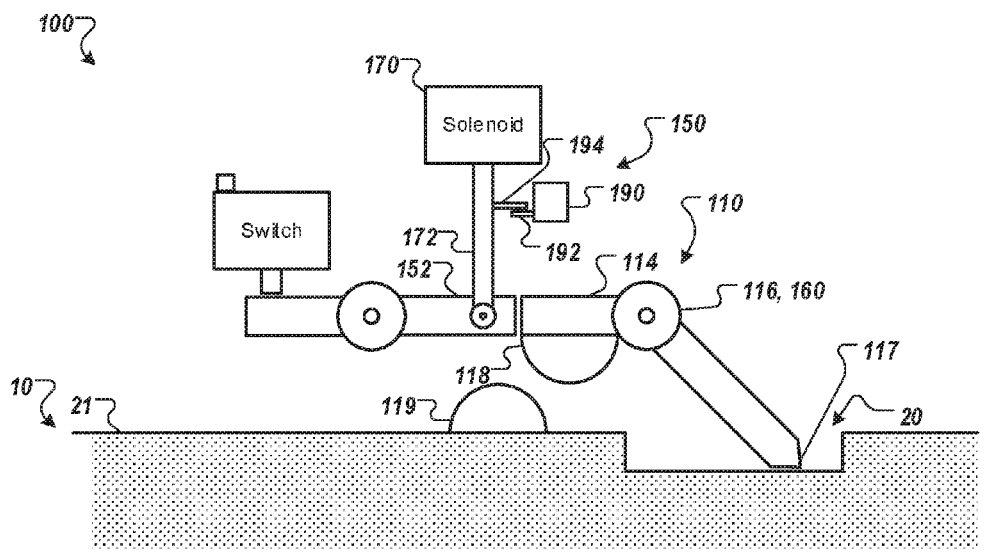
FIG. 7 is a block diagram that shows another example of a track lock system reset to a locked configuration.

Referring briefly to FIG. 7, which will be described in more detail later in this description, a block diagram shows another example of the track lock system 100 in which the cam 119 is not in contact with the cam 118. The pawl assembly 110 is kept in the pawl locked configuration due to mechanical interference between the cam arm 114 and the lock arm 152, which is in the lock locked position.

Figure 3:
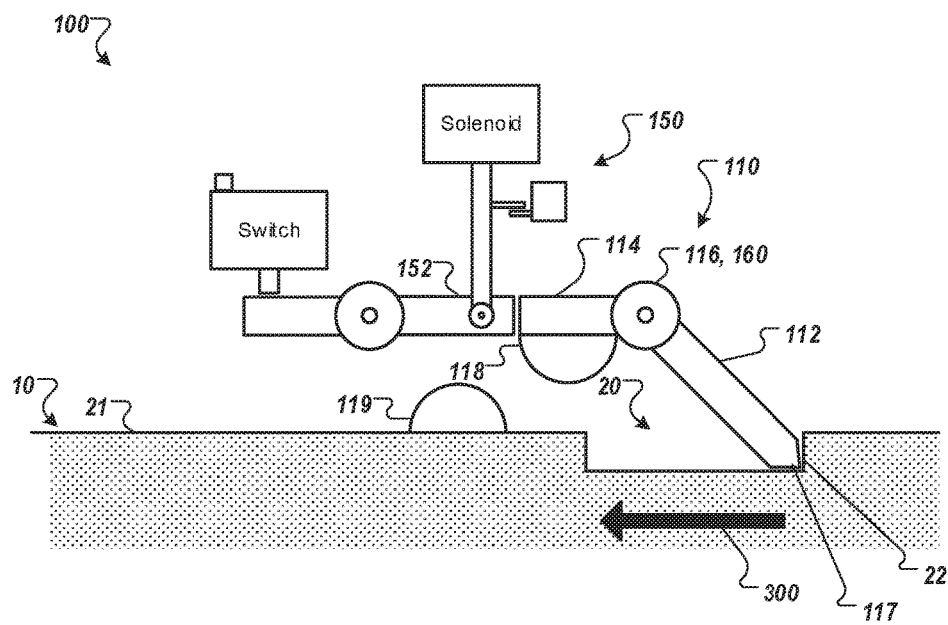
FIG. 3 is a block diagram that shows another example of a track lock system in a locked configuration.

FIG. 3 is a block diagram that shows another example of the track lock system 100 in the locked configuration. In this example, the track lock system 100 is preventing inadvertent in-flight deployment of the slider assembly 10. In the illustrated example, the slider assembly 10 has been moved, as indicated by arrow 300, relative to the track lock assembly 100 and relative to the position of the slider assembly 10 illustrated in FIG. 2.

In the illustrated example, the cam 119 has moved out of contact with the cam 118. Interference between the lock arm 152 and the cam arm 114 resists the torque provided by the compliant member 160, and holds the pawl assembly 150 in the pawl locked configuration. As the slider assembly 10 continues to move, the distal end 117 of the pawl arm 112 contacts a slot end 22 of the slot 20. Contact between the distal and 117 and the slot end 22 resists further movement of the slot assembly 10 as indicated by the arrow 300.

Figure 4:
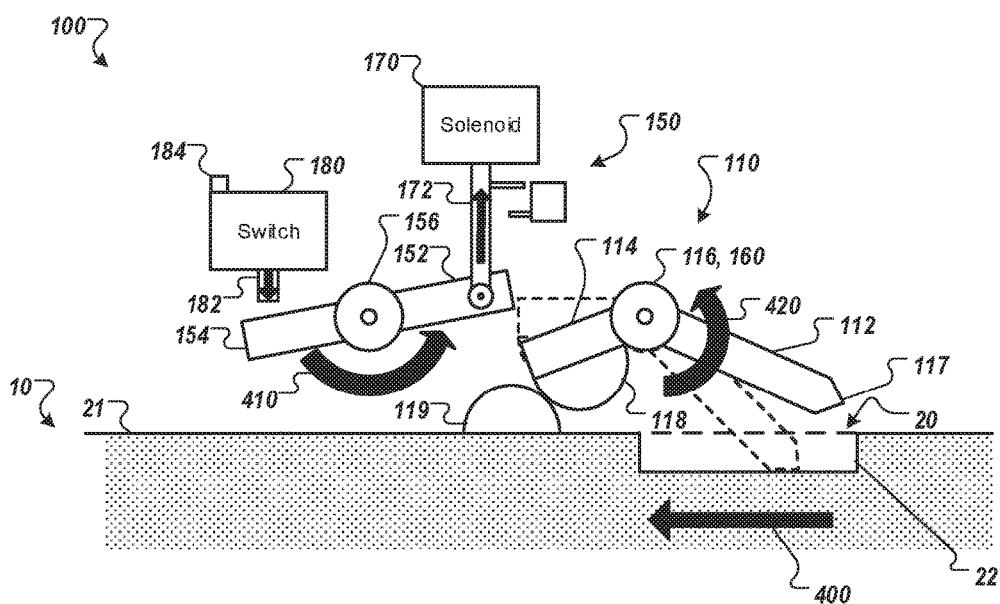
FIG. 4 is a block diagram that shows another example of a track lock system in an unlocked configuration.

FIG. 4 is a block diagram that shows another example of the track lock system 100 in the unlocked configuration. In the illustrated example, the slider assembly 10 has been moved, as indicated by arrow 400, relative to the track lock assembly 100 and relative to the position of the slider assembly 10 illustrated in FIG. 2.

In the illustrated example, (e.g., as compared to FIG. 7), the position lock assembly 150 has been put into the lock unlocked configuration. The position lock assembly 150 includes the lock arm 152 which extends from a lock axis 156, a switch arm 154 that extends from the lock axis 156 substantially opposite from the lock arm 152 (e.g., approximately 180 degrees apart). The lock axis 156 can be partly rotated to cause the position lock assembly 150 to move between the lock locked configuration and the lock unlocked configuration.

Movement of the position lock assembly 150 is urged by a solenoid 170. The solenoid 170 includes a plunger 172 that is connected to the lock arm 152, although in some embodiments the plunger 172 could be connected to the switch arm 154 or any other appropriate part of the position lock assembly 150. When energized, the solenoid 170 and the plunger 172 urge movement of the position lock assembly 150 from the lock locked configuration to the lock unlocked configuration, as indicated by the arrow 410.

In the lock unlocked configuration, the lock arm 152 is moved out of contact with the cam arm 114. When the position lock assembly 150 is in the lock unlocked configuration, the pawl assembly 110 is able to be urged toward the pawl unlocked position by the compliant member 160, as indicated by the arrow 420. For example, as the slider assembly 10 moves from the position illustrated in FIG. 2 to the position illustrated in FIG. 4, the cam 119 moves away from contact with the cam 118. The cam 118, as urged by torque provided by the compliant member 160, follows the contour of the cam 119, which lets the pawl assembly 110 rotate the distal end 117 out of the slot 20 to a position above the surface 21.

The position lock assembly 150 also includes a switch 180. The switch 180 includes a plunger 182 that can contact the switch arm 154, although in some embodiments the plunger 182 could be connected to the lock arm 152 or any other appropriate part of the position lock assembly 150. The plunger 182 is configured to actuate the switch 180 such that the switch 180 an provide an first output signal at a signal port 184 when the position lock assembly 150 is in the lock locked position and provides a second output signal at the signal port 184 when the position lock assembly 150 is in the lock unlocked position. In some embodiments, the signal output port 184 can be in communication with an indicator light, a controller, a buzzer, or any other appropriate external device (e.g., Electronic Engine Controller (EEC), Full Authority Digital Engine Controller (FADEC)) that has a state that can be altered when the position lock assembly 150 enters and exits the lock locked configuration.

Figure 5:
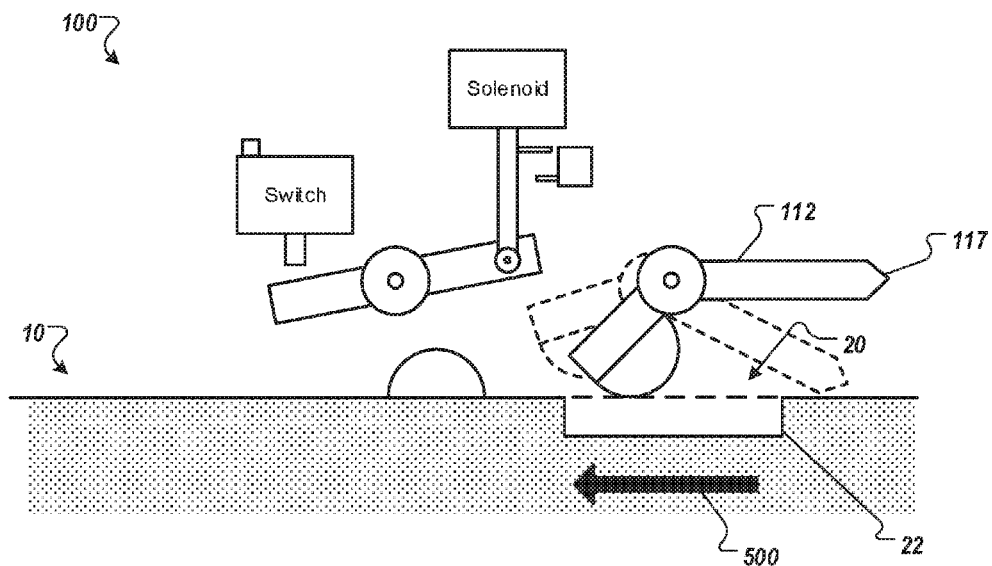
FIG. 5 is a block diagram that shows another example of a track lock system in an unlocked configuration.

FIG. 5 is a block diagram that shows another example of the track lock system 100 in the unlocked configuration. In the illustrated example, the slider assembly 10 has been moved, as indicated by arrow 500, relative to the track lock assembly 100 and relative to the position of the slider assembly 10 illustrated in FIG. 4. With the distal and 117 positioned out of the slot 20, the slider assembly 10 can continue to move without causing interference between the pawl arm 112 and the slot end 22.

Figure 6:
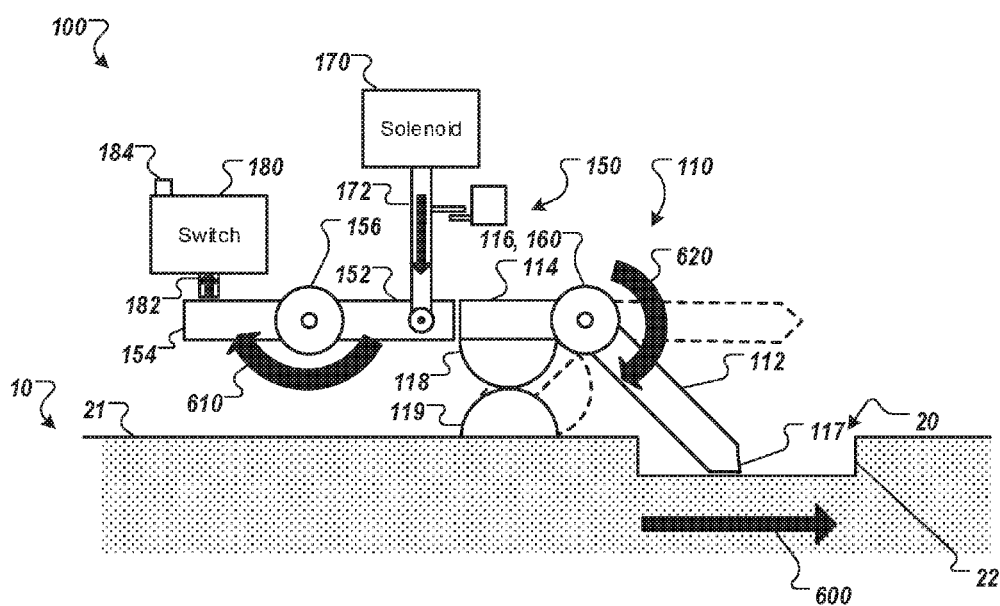
FIG. 6 is a block diagram that shows an example of a track lock system reset to a locked configuration.

FIG. 6 is a block diagram that shows an example of the track lock system 100 reset to the locked configuration. In the illustrated example, the slider assembly 10 has been moved, as indicated by arrow 600, relative to the track lock assembly 100 and relative to the position of the slider assembly 10 illustrated in FIG. 5.

In the illustrated example, the solenoid 170 has been de-actuated to cause the plunger 172 to extend, causing the position lock assembly 150 to partly rotate, as indicated by the arrow 610, about the lock axis 156 to the lock locked position. In the lock locked position, the switch arm 154 contacts the plunger 182, actuating the switch 180 to provide a signal at the signal port 184 to indicate that the position lock assembly 150 is in the lock locked configuration.

As the slider assembly 10 moves (e.g., under hydraulic power), the cam 119 contacts the cam 118. The cam 118 follows the cam 119, transferring energy from the lateral movement of the slider assembly 10 into rotational movement of the pawl assembly 110, as indicated by arrow 620. Contact between the pawl 119 and the pawl 118 rotates the pawl assembly 110 against the bias of the compliant member 160 and into the pawl locked configuration. With the position lock assembly 150 in the lock locked configuration, the lock arm 152 interferes with movement of the cam arm 114, holding the lock assembly 110 in the pawl locked configuration. In some implementations, the solenoid 170 could be energized again to cause the position lock assembly 150 to release the pawl assembly 110 to the unlocked configuration.

FIG. 7 is a block diagram that shows another example of the track lock system 100 reset to the pawl locked configuration. In some implementations, the pawl locked configuration may be the normal in-flight and/or on-ground position of the track lock system 100. In the illustrated example, the cam 119 is not in contact with the cam 118. The compliant member 160 provides a bias that urges rotation of the pawl assembly 110 toward the pawl unlocked position and removal of the distal end 117 from the slot 20. The pawl assembly 110 is kept in the locked configuration due to mechanical interference between the cam arm 114 and the lock arm 152, which is in the lock locked position.

The position lock assembly 150 includes a manual override assembly 190. The manual override assembly 190 is configurable to an override inactive configuration and an override active configuration. The manual override assembly 190 is a rotary assembly in which an override arm 192 is offset from the axis of rotation of the manual override assembly 190. In the override inactive configuration, the override arm 192 is offset such that an override arm 192 does not interfere with the movement of a plunger arm 192 that is coupled to the plunger 172. For example, as the solenoid 170 is energized and de-energized, the plunger 172 moves along its major axis and the plunger arm 192 moves with the plunger 172, not contacting the override arm 192.

Figure 8:
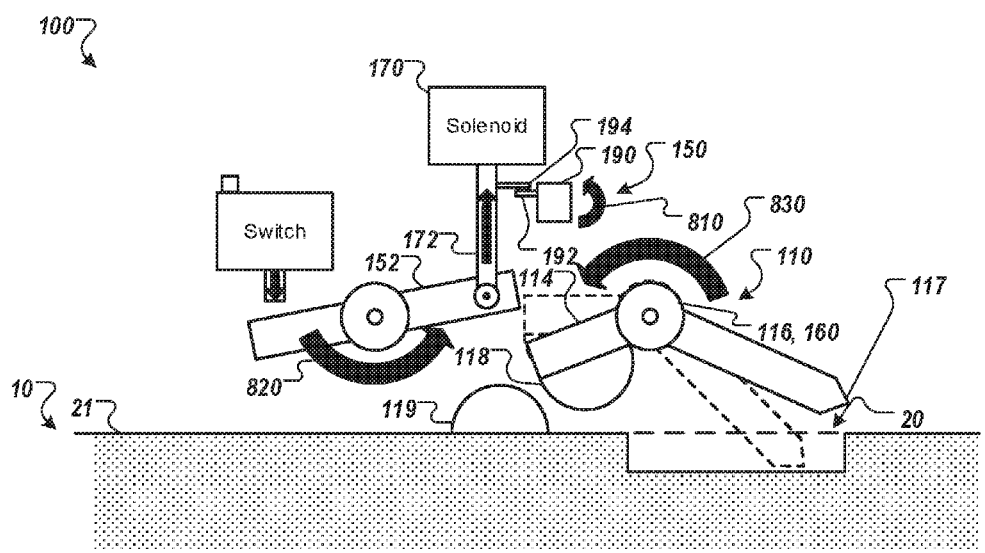
FIG. 8 is a block diagram that shows another example of a track lock system in a manually unlocked configuration.

FIG. 8 is a block diagram that shows an example of the track lock system in a manually unlocked configuration. In the illustrated example, the manual override assembly 190 has been rotated into the override active configuration, as indicated by arrow 810. As the manual override assembly 190 is rotated, the manual override arm 192 is moved into contact with the plunger arm 192 and urges movement of the plunger 170 (e.g., and in turn, the position lock assembly 150) into the lock unlocked configuration, as indicated by the arrow 820. For example, as the solenoid 170 is energized and de-energized, contact between the manual override arm 192 and the plunger arm 194 prevents the plunger 172 from moving along its major axis out of the lock unlocked configuration.

With the position lock assembly 150 in the lock unlocked configuration, as effected by the manual override assembly 190 or by actuation of the solenoid 170, the pawl assembly 110 is able to rotate into the pawl unlocked configuration, as indicated by the arrow 830. In some embodiments, the manual override assembly 190 may be configured to put the position lock assembly 150 into the lock locked configuration, to put the position lock assembly 150 into the lock unlocked configuration, to not interfere with operation of the solenoid 170, or to perform any combination of these actions.

In some embodiments, the position lock assembly 150 may be a clutch assembly or any other appropriate assembly that can selectably prevent and permit rotation of the pawl axis 116. For example, a clutch may be provided on the pawl axis. When the clutch is inactive, the pawl axis 116 may be permitted to pivot. When the clutch is active, the pawl axis 116 may be mechanically blocked from permitting movement of the pawl assembly 110.

Figure 9:
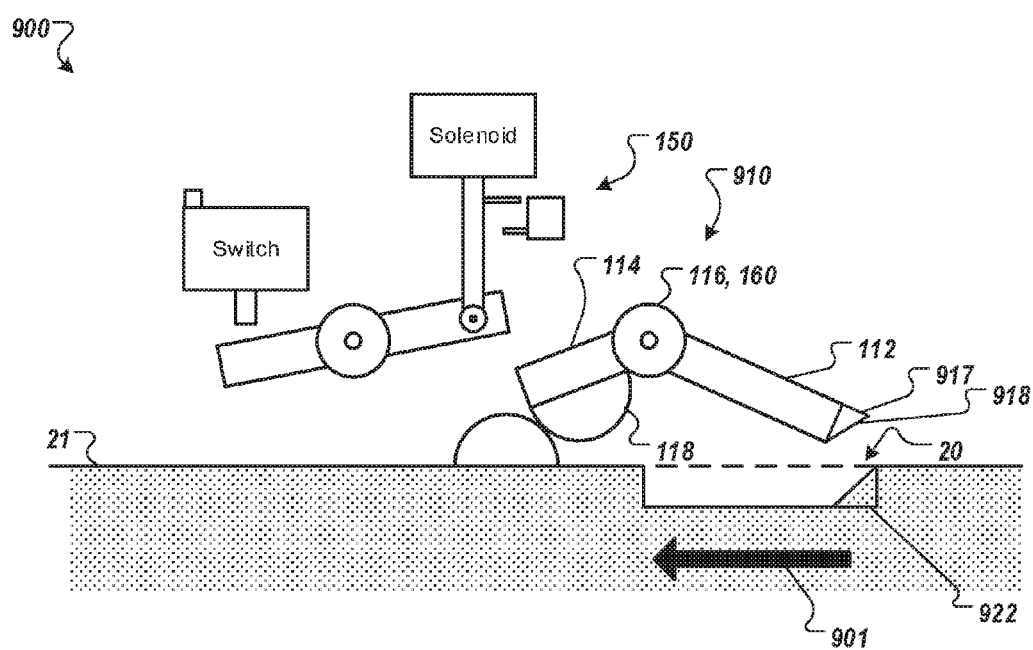
FIG. 9 is a block diagram that shows an example of another track lock system.

FIG. 9 is a block diagram that shows an example of another track lock system 900. The track lock system 900 includes a pawl assembly 910. In the present example, the pawl assembly 910 of the track lock system 900 is shown in an unlocked configuration. The pawl assembly 910 includes the pawl arm 112 extending from the pawl axis 116, and the cam arm 114 extending from the pawl axis 116 substantially radially opposite the pawl axis 116. The pawl assembly 910 is configured to pivot at least partly about the pawl axis 116. The track lock system 900 is arranged relative to the slider assembly 10 such that movement of the slider assembly 10 is substantially perpendicular to the rotation of the pawl axis 116.

The pawl arm 112 includes a distal end 917 that can be pivoted about the pawl axis 116 into contact with the surface 21 and the slot 20, as was discussed previously in the description of FIG. 2. The distal end 917 includes an angular face 918 that is configured to contact an angular slot end 922 of the slot 20. As the slider assembly 10 moves, the distal end 917 of the pawl arm 112 contacts the angular slot end 922. Contact between the distal end 917 and the angular slot end 922 resists further movement of the slot assembly 10 as indicated by the arrow 901.

When the position lock assembly 150 is unlocked under normal operating conditions, the compliant member 160 will rotate the distal 917 out of the slot 20. Under abnormal operating conditions, however, the pawl assembly 910 may not be able to rotate under the urging of the compliant member 160 alone. For example, in an aircraft application, icing may occur on the outer surface of the aircraft, including the slider assembly 10 (e.g., ice buildup in the slot 20) and/or the pawl assembly 910, and resist the bias of the compliant member 160. Under conditions in which the pawl assembly 910 is prevented from moving by the bias of the compliant member 160 alone, as the slider assembly 10 moves as indicated by the arrow 901, the angular face 918 may be brought into sliding contact with the angular slot end 922. As the slider assembly 10 continues to move (e.g., under hydraulic power), the relative movement of the angular slot end 922 to the angular face 918 may provide additional force that can urge rotation of the pawl assembly 910 to the unlocked configuration. In some embodiments, the relative movement of the angular slot end 922 to the angular face 918 under the power of the slider assembly 10 may also serve to clear ice or other debris out of the slot 20.

Figure 10:
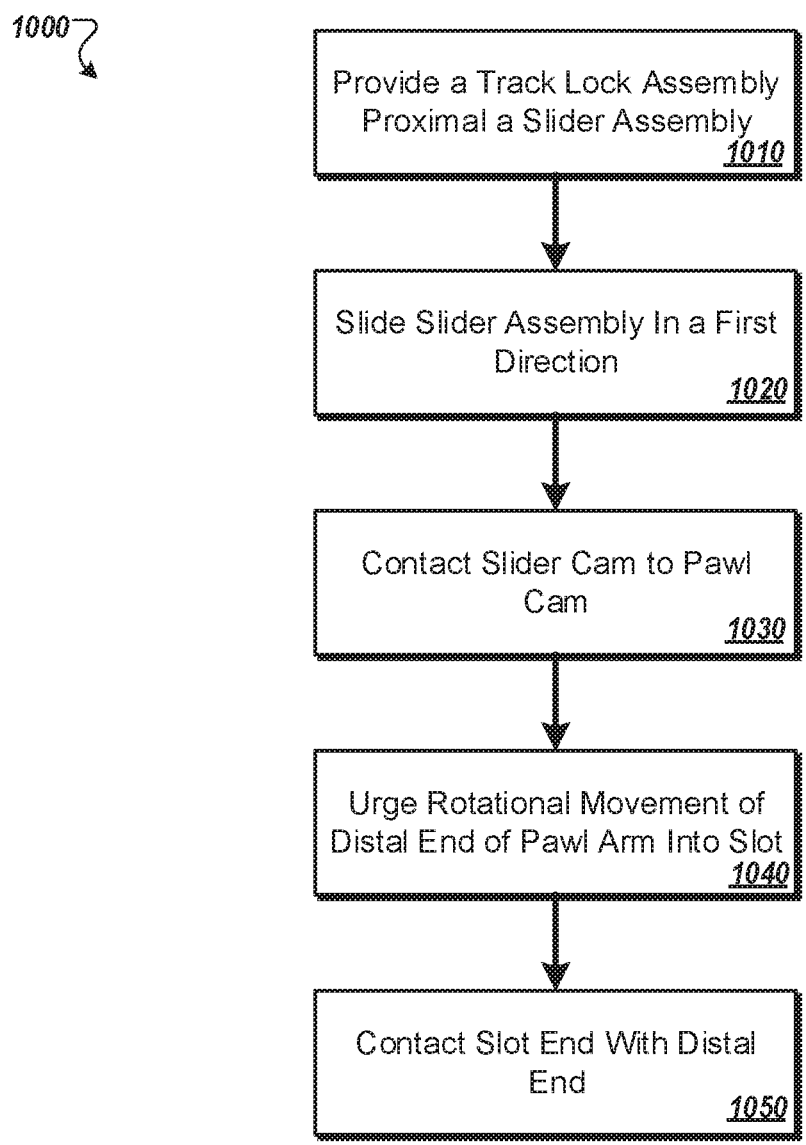
FIG. 10 is flow chart that shows an example of a process for locking a track lock system.

FIG. 10 is flow chart that shows an example of a process 1000 for locking a track lock system. In some implementations, the process 1000 can be used with the track lock system 100 of FIGS. 1-9.

At 1010, a track lock assembly is provided proximal a slider assembly. The track lock assembly includes a pawl assembly having a pawl cam and a pawl arm configured to pivot together about a pawl axis between a pawl locked position and a pawl unlocked position, and a position lock assembly configured to selectably permit or prevent movement of the pawl assembly between the pawl locked position and the pawl unlocked position. For example, the track lock assembly 100 can be provided near enough to the slider assembly 10 that the pawl arm 112 can reach the slot 20.

At 1020, the slider assembly is slid in a first direction perpendicular to the pawl axis. For example, the slider assembly 10 can be moved in the direction indicated by arrow 200 of FIG. 2.

At 1030, a slider cam is contacted to the pawl cam in the pawl unlocked position. At 1040, contact between the slider cam and the pawl cam urges rotational movement of a distal end of the pawl arm into the slot. For example, when the slider assembly 10 is moved from its position relative to the pawl assembly 110 as shown in FIG. 1, to the position shown in FIG. 2, the cam 119 contacts the cam 118. Hydraulic or other mechanical force used to move the slider assembly as indicated by arrow 200, contact between the cam 119 and the cam 118 causes the pawl assembly to pivot and cause the pawl arm 112 to extend the distal end 117 into the slot 20.

At 1050 a slot end is contacted with the distal end as to interfere with sliding of the slider in the first direction. For example, as illustrated in FIG. 3, the slider assembly 10 has moved further as indicated by arrow 300, bringing the slot end 22 into contact with the distal end 117.

In some implementations, the process 1000 can also include locking, by the position lock assembly, the pawl assembly in the pawl locked position such that the distal end of the pawl arm is within the slot. For example, the position lock assembly 150 can be put into the lock locked configuration, which can prevent the distal end 117 from being rotated out of the slot 20.

In some implementations, the process 1000 can also include unlocking, by the position lock assembly, the pawl assembly, rotating the pawl assembly to the pawl unlocked position such that the distal end of the pawl arm is removed from the slot, and sliding the slider assembly in a second direction opposite the first direction perpendicular to the pawl axis. For example, in the illustration of FIG. 4, the solenoid 170 has been actuated to cause the position lock assembly 150 be put into the lock unlocked configuration which allows the compliant member 160 urge rotation of the distal end 117 out of the slot 20 to permit movement of the slider assembly 10 in the direction of arrow 400.

In some implementations, the pawl assembly also includes a compliant member configured to urge the pawl assembly into the pawl unlocked position, and the process 1000 can include urging, by contact between the slider cam and the pawl cam, rotational movement of a distal end of the pawl arm into the slot further comprises biasing the compliant member, and rotating the pawl assembly to the pawl unlocked position such that the distal end of the pawl arm is removed from the slot can include urging, by the compliant member, rotation of the pawl assembly to the pawl unlocked position such that the distal end of the pawl arm is removed from the slot. For example, the pawl axis 116 includes the compliant member 160. The compliant member 160 can be a spring or other elastic device that can provide a bias to pivot the pawl assembly 110 to the unlocked configuration as illustrated in FIG. 4.

In some implementations, the process 1000 can include providing a manual lock assembly having a first configuration which does not affect movement of the position lock assembly and a second configuration in which the position lock assembly is urged into the lock unlocked position, and configuring the manual lock assembly into the second configuration to urge the position lock assembly into the lock unlocked position. For example, the track lock assembly 100 includes the manual override assembly 190. The manual override assembly 190 can be put in an override inactive configuration as shown in FIG. 7, and can be put in an override active configuration as shown in FIG. 8.

In some implementations, the process 1000 can include providing a sensor configured to identify the lock locked position and the lock unlocked position; and provide a second indication when the position lock assembly is in the lock unlocked position, provide, by the sensor, a first indication when the lock assembly is in the lock locked position, and provide, by the sensor, a second indication when the lock assembly is in the lock unlocked position. For example, the position lock assembly 150 includes the switch 180, which is configured to provide a signal at the signal port 184 to indicate whether the position lock assembly 150 is in the lock locked configuration or in the lock unlocked configuration.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A track lock assembly comprising:
   a pawl assembly comprising:
      a cam arm extending from a pawl axis and having a pawl cam; and
      a pawl arm extending from the pawl axis to a distal end configured to engage a slot in a slider assembly and contact a slot end of the slot, wherein the pawl assembly is configured to rotate about the pawl axis from a pawl locked position in which the distal end of the pawl arm is engaged in the slot and is positioned to contact the slot end upon movement of the slider assembly, and the pawl cam is disengaged from a slider cam extending from the slider assembly, to a pawl unlocked position in which the distal end of the pawl arm is rotated away from the slot to a position that does not interfere with movement of the slider assembly and the pawl cam is rotated toward contact with the slider cam extending from the slider assembly; and
   a position lock assembly comprising a first lock arm extending from a lock axis and an actuator configured to urge rotation of the first lock arm between a lock locked position and a lock unlocked position, the first lock arm configured to engage and retain the cam arm in the pawl locked position when the first lock arm is in the lock locked position and disengage the cam arm in the lock unlocked position such that the pawl assembly is able to rotate to the pawl unlocked position.

2. The track lock assembly of claim 1, wherein the slider assembly is configured to slide the slider cam and the slot substantially perpendicular to the pawl axis such that movement of the slider assembly urges contact between the slider cam and the lock cam and rotation of the pawl assembly into the pawl locked position.

3. The track lock assembly of claim 1, further comprising a sensor configured to provide a first indication when the lock assembly is in the lock locked position and provide a second indication when the position lock assembly is in the lock unlocked position.

4. The track lock assembly of claim 1, further comprising a manual lock assembly having a first configuration which does not affect movement of the position lock assembly, and a second configuration in which the position lock assembly is urged into the lock unlocked position.

5. The track lock assembly of claim 1, wherein the pawl assembly further comprises a biasing member configured to urge rotation of the pawl assembly.

6. The track lock assembly of claim 5, wherein the biasing member is configured to urge rotation of the pawl assembly from the pawl locked position to the pawl unlocked position.

7. The track lock assembly of claim 1, wherein the slider assembly is configured to slide the slider cam and the slot substantially perpendicular to the pawl axis, such that movement of the slider assembly urges contact between the slider cam and the lock cam and urges rotation of the pawl assembly into the pawl locked position where the pawl assembly will contact the slot end should inadvertent motion of the slider and slot towards the pawl axis occur.

8. A track lock assembly comprising:
a pawl assembly comprising:
- a cam arm extending from a pawl axis and having a pawl cam; and
- a pawl arm extending from the pawl axis to a distal end configured to engage a slot in a slider assembly and contact an end of the slot, wherein the pawl assembly is configured to rotate about the pawl axis from a pawl locked position in which the distal end of the pawl arm is engaged in the slot and is positioned to contact the slot end upon movement of the slider assembly, and the pawl cam is disengaged from a slider cam extending from the slider assembly, to a pawl unlocked position in which the distal end of the pawl arm is biased to rotate away from the slot to a position that does not interfere with movement of the slider assembly and the pawl cam is rotated toward contact with the slider cam extending from the slider assembly; and
- a position lock assembly comprising an actuator configured to selectably engage the pawl assembly to retain the pawl assembly in the pawl locked position and disengage the pawl assembly which does not affect movement of the pawl assembly between the pawl locked position and the pawl unlocked position.

9. The track lock assembly of claim 8, wherein the slider assembly is configured to slide the slider cam and the slot substantially perpendicular to the pawl axis such that movement of the slider assembly urges contact between the slider cam and the pawl cam and urges rotation of the pawl assembly into the pawl locked position.

10. The track lock assembly of claim 8, further comprising a sensor configured to provide a first indication when the position lock assembly is engaged with the pawl assembly and provide a second indication when the position lock assembly is disengaged from the pawl assembly.

11. The track lock assembly of claim 8, further comprising a manual lock assembly having a first configuration which does not affect engagement of the position lock assembly with the pawl assembly, and a second configuration in which the position lock assembly is urged into engagement with the pawl assembly.

12. The track lock assembly of claim 8, wherein the pawl arm includes an angular pawl face at the distal end opposite the pawl axis, and the slot end has an angular end face.

13. The track lock assembly of claim 8, wherein the pawl assembly further comprises a biasing member configured to urge rotation of the pawl assembly.

14. The track lock assembly of claim 13, wherein the biasing member is configured to urge rotation of the pawl assembly from the pawl locked position to the pawl unlocked position.

15. The track lock assembly of claim 8, wherein the slider assembly is configured to slide the slider cam and the slot substantially perpendicular to the pawl axis, such that movement of the slider assembly urges contact between the slider cam and the lock cam and urges rotation of the pawl assembly into the pawl locked position where the pawl assembly will contact the slot end should inadvertent motion of the slider and slot towards the pawl axis occur.

* * * * *

UNITED STATES PATENT AND TRADEMARK OFFICE
CERTIFICATE OF CORRECTION

PATENT NO.         : 10,247,138 B2
APPLICATION NO.    : 15/617227
DATED              : April 2, 2019
INVENTOR(S)        : Joseph Thomas Kopecek Page 1 of 1

It is certified that error appears in the above-identified patent and that said Letters Patent is hereby corrected as shown below:

In the Specification

Column 1, Line 8, delete "which" and insert -- which are --.

Signed and Sealed this
Thirty-first Day of March, 2020

Andrei Iancu
*Director of the United States Patent and Trademark Office*